United States Patent Office 2,918,379
Patented Dec. 22, 1959

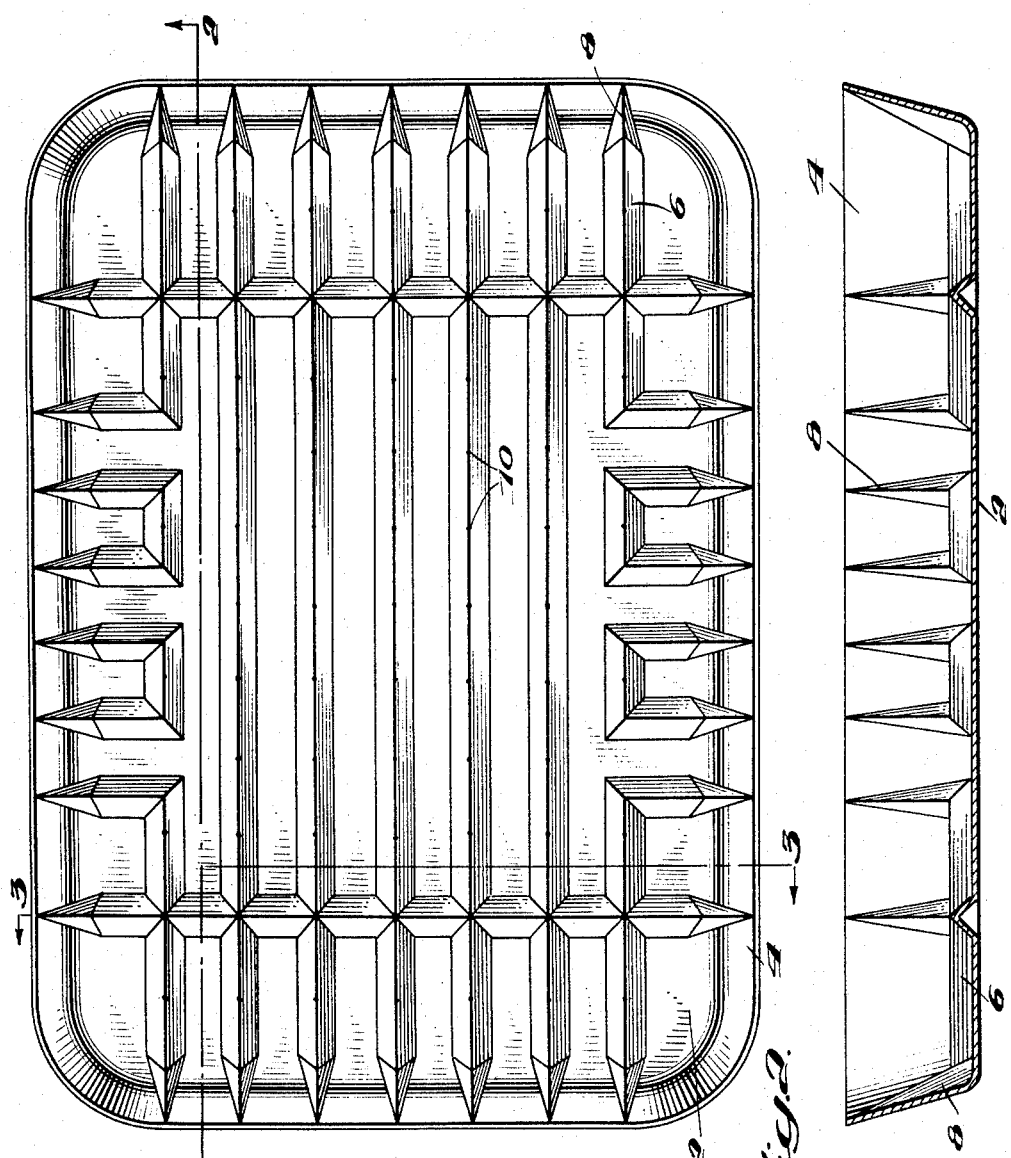

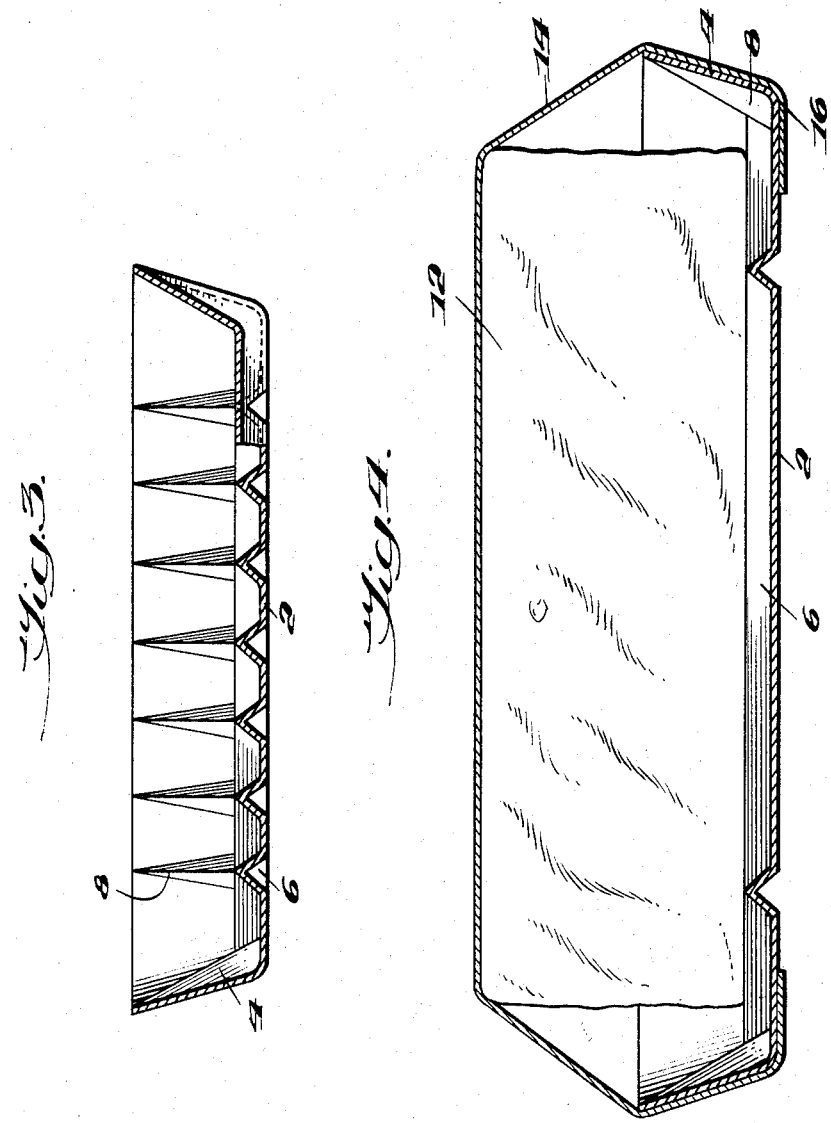

2,918,379
MEAT PACKAGING AND THE LIKE

Robert Lurie, Jacksonville, Fla., assignor to Campbell-Lurie Plastics, Inc., a corporation of Florida Application August 4, 1958, Serial No. 753,026

9 Claims. (Cl. 99—174)

The invention relates to trays intended for use in the sale of articles, especially meats, and to meat packages utilizing such trays.

Prepackaged meats are often sold in cardboard trays covered with transparent plastic sheet material. However, many persons feel that the meat absorbs flavor from the cardboard and that its taste is thereby spoiled. Also, the trays absorb the juices of the meat and become soggy. This tends to disintegrate the cardboard, and also makes the handling and storing of the trays messy and dirty.

The primary object of the present invention is to provide a tray which avoids the disadvantages of the prior art devices.

Another object of the invention is to provide a tray of plastic material which does not impart a flavor to the meat or absorb the meat juices.

A further object of the invention is to provide a tray which can be made attractive in appearance, of any desired color or pattern.

I have found that meat, when packaged in a container which is impervious to air, tends to lose its freshness or bloom and to become discolored and unattractive in appearance. To avoid this result, I provide in the tray very small openings which permit the access of air into the tray but which are so small as to prevent the juices of the meat from seeping out of the tray.

More particularly, I provide V-shaped ribs across the bottom of the tray which space the meat from the bottom. Holes of around 0.001" diameter are formed in the apexes and side walls of these ribs, which are hollow underneath so that air can circulate under the tray and through the holes into the interior of the tray.

The tray may be formed by stamping and shaping it from a sheet of plastic sheet material of uniform thickness. This sheet may be of plain or colored plastic, or may be a decorative sheet of the type described in my application for Sheet Material and Method of Producing and Shaping the Same filed of even date herewith.

Further advantages and objects of the invention will appear more fully from the following description, especially when taken in conjunction with the accompanying drawings which form a part thereof.

In the drawings:

Fig. 1 shows in top plan view a tray embodying the invention;

Figs. 2 and 3 are cross-sections on the lines 2—2 and 3—3 thereof; and

Fig. 4 is a cross-section through a package of meat utilizing such a tray.

The tray includes a bottom wall 2 and upstanding sloping side walls 4. Across the bottom of the tray run V-shaped ribs 6, hollow beneath, which are substantially lower than the side walls, for example about one-fifth the height. These ribs have tapering extensions 8 which extend up the side walls 4.

While the arrangement of ribs shown in Fig. 1 is both practical, advantageous and attractive, many other configurations of the ribs are possible within the scope of the invention. Furthermore, the shape and size of the tray can be varied as desired.

In the apexes of the ribs, and also in the side walls, are provided a plurality of very fine holes 10, of such size that they will admit air to permit the meat to "breathe," but small enough to prevent the escape of the meat juices. Holes of a diameter of about 0.001" are satisfactory for this purpose.

Fig. 4 shows a cut of meat 12 packaged in such a tray and resting on ribs 6. A cover sheet 14 of transparent plastic is placed over the meat and its edges are sealed along the sides of the tray, that is, to the side walls or the outer edges of the bottom walls. Preferably, the cover sheet is heat sealed, as at 16, to the edges of the bottom walls. The holes 10 are thus left uncovered to permit access of air which can flow along the lower faces of hollow ribs 6 even when the package is resting on a flat surface.

While I have described herein one embodiment of my invention, I wish it to be understood that I do not intend to limit myself thereby except within the scope of the claims hereto or hereinafter appended.

I claim:

1. A container comprising a thin-walled tray of synthetic resin plastic material having a bottom and upstanding side walls, and having upstanding ribs across the bottom of substantially less height than the sides, the upper edges of the ribs being spaced above the bottom, said ribs having very small holes therethrough at points above the bottom wall of such fineness as to admit air while preventing passage of liquids.

2. A container as claimed in claim 1 in which the ribs extend up the inside of the side walls.

3. A container as claimed in claim 2 in which said ribs are V-shaped.

4. A container as claimed in claim 3 which is pressed out from a sheet of plastic material of substantially uniform thickness, said ribs being hollow underneath.

5. A container as claimed in claim 1 in which said ribs are V-shaped.

6. A container as claimed in claim 3 which is pressed out from a sheet of plastic material of substantially uniform thickness, said ribs being hollow underneath.

7. A container as claimed in claim 1 which is pressed out from a sheet of plastic material of substantially uniform thickness, said ribs being hollow underneath.

8. A package comprising a thin-wall tray of synthetic resin plastic material having a bottom and upstanding side walls, and having upstanding ribs across the bottom of substantially less height than the sides, said ribs having very small holes therethrough of such fineness as to admit air while preventing passage of liquids, meat in said tray resting on said ribs, and a cover sheet overlying said meat and having its edges sealed along the sides of the tray, leaving the holes exposed.

9. A package as claimed in claim 8 in which said cover sheet is of transparent plastic and is heat-sealed to the tray.

References Cited in the file of this patent
UNITED STATES PATENTS

| | | |
|---|---|---|
| 2,673,003 | Stewart | Mar. 23, 1954 |
| 2,802,411 | Riener | Aug. 13, 1957 |
| 2,859,122 | Maturi et al. | Nov. 4, 1958 |